Aug. 25, 1953 A. W. SHARP 2,649,615
SECTIONAL SCALDING TANK FOR FOWL
Filed Aug. 5, 1950 2 Sheets-Sheet 2
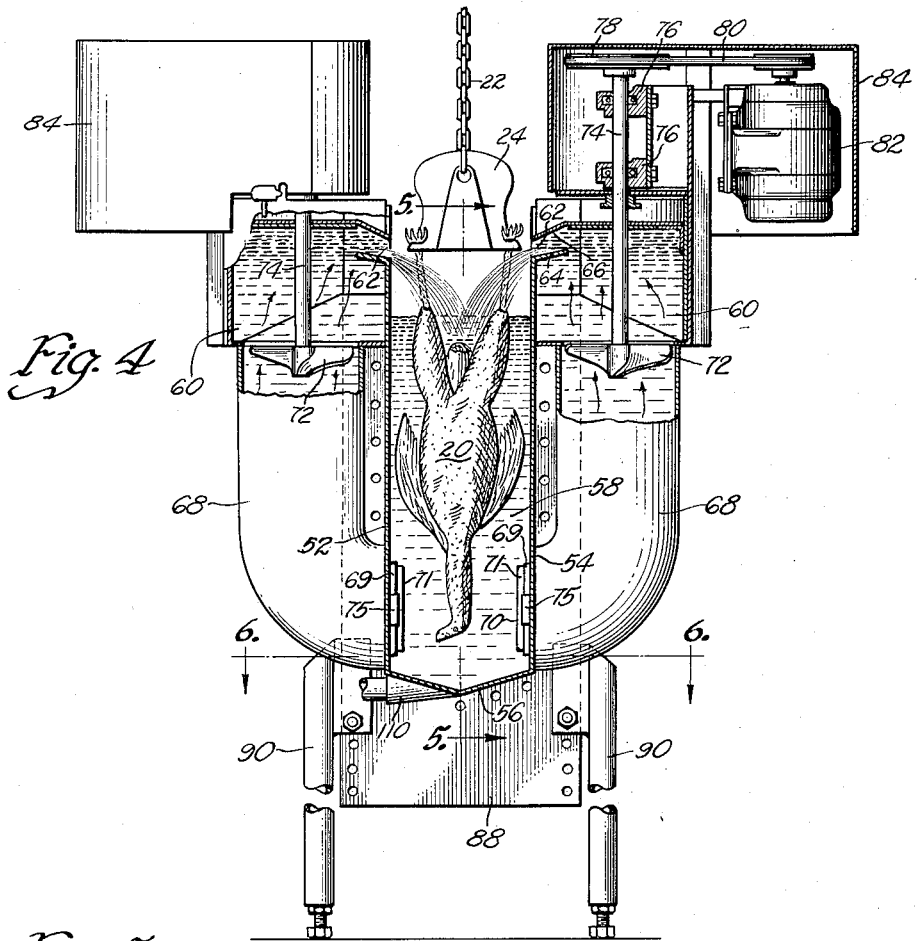
Fig. 4
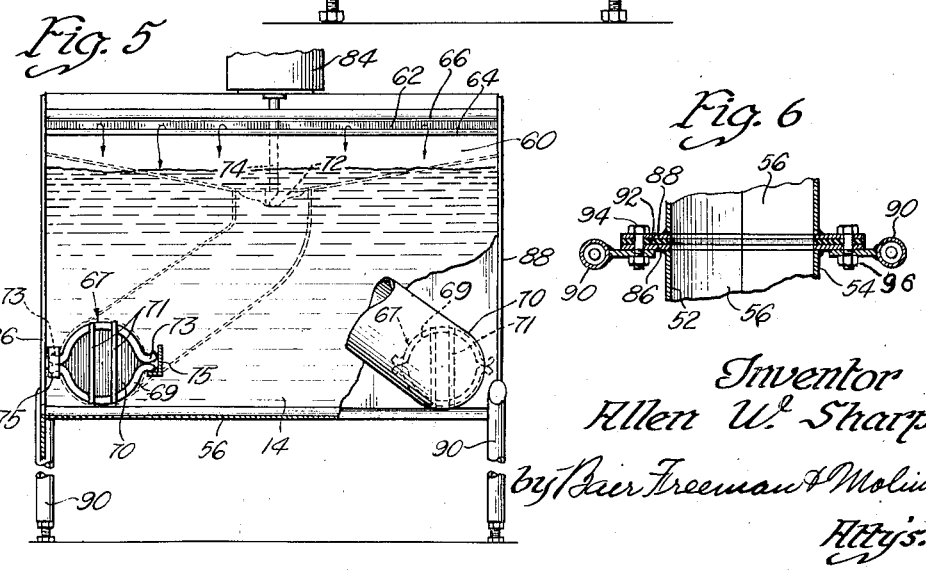
Fig. 5
Fig. 6
Inventor
Allen W. Sharp
by Bair, Freeman & Molinare
Atty's.

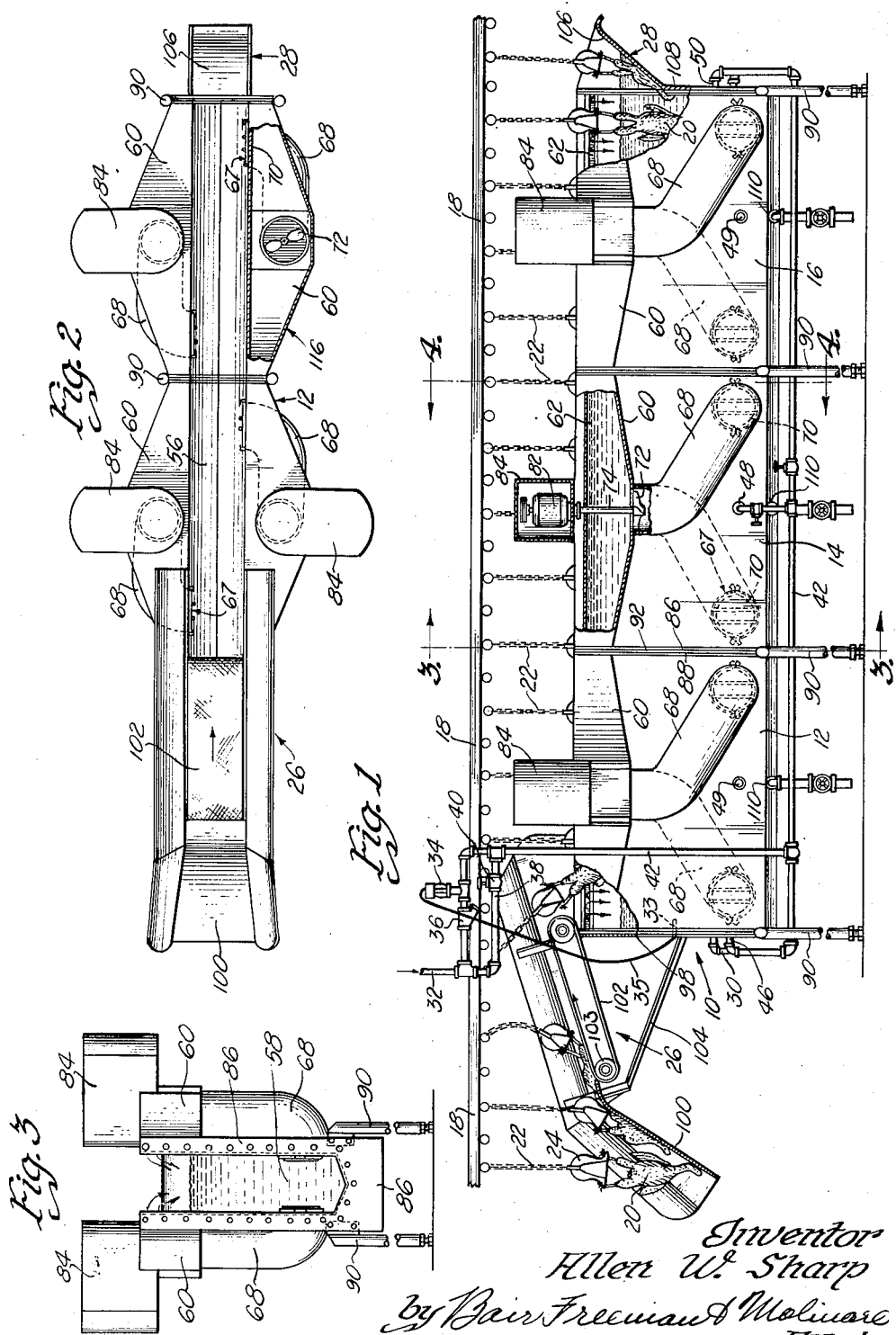

Patented Aug. 25, 1953

2,649,615

UNITED STATES PATENT OFFICE 2,649,615

SECTIONAL SCALDING TANK FOR FOWL

Allen W. Sharp, Ottumwa, Iowa, assignor to Barker Poultry Equipment Company, Ottumwa, Iowa, a corporation of Iowa Application August 5, 1950, Serial No. 177,905

10 Claims. (Cl. 17—11.2)

1

This invention relates to a scalding tank for fowls and the like and more particularly to a sectional scalding tank made up of a plurality of sections, each section having independent means for recirculation of the water.

In the poultry industry, modern methods of cleaning the birds requires the immersion of the birds in heated water prior to picking the feathers from the birds. This immersion of birds in heated water is referred to as scalding, which includes generically both hard scalding at which the temperature of the water is about 140–145° and slack scalding, or semi-scalding, at which the temperature of the water is about 125–130°.

The processing of poultry having gone to the mass production stage requires the use of conveyor lines. The passage of the birds through the scalding tank is also an automatic step. Since the conveyor line is continually moving, the length of the scalding tank is determined by the speed of the conveyor and the length of time that the bird is immersed in the heated water. The higher the temperature, the less time is spent in the heated water.

Since different temperatures and times of immersion of the birds are used by different processors and since different conveyor speeds are also used, it is necessary that different lengths of scalding tanks are also provided. If the speed of the poultry conveyor is increased it may be necessary to change the length of the scalding tank.

In the recirculation of water in a scalding tank, it is very desirable that most, if not all, of the water be subjected to mixing action. This is necessary because additional water and steam are constantly being added to the water in the scalding tank and in order to achieve a substantially uniform temperature throughout, much mixing and blending is required.

The discharge of water above a fowl in the water tends to submerge the fowl and prevent its floating on top of the water. The fall of water over a fowl also results in better penetration of the water between the feathers. However, in the past this discharge of water was never directed. If the discharged water were directed onto the fowl, greater efficiency of penetration between the feathers would result.

In the scalding of fowl, a certain amount of water is lost from the tank with each fowl that is removed therefrom. Accordingly a certain amount of fresh water must be continually added to the water in the scalding tank.

Thus, one of the objects of this invention is to

2 provide a scalding tank for fowls, which tank is of variable length, being made up of a plurality of sections joined together.

Another object of this invention is to provide a scalding tank for fowls which is provided with a plurality of means for recirculating the water therein.

A further object of this invention is to provide a scalding tank wherein the water therein is continually subjected to mixing action.

Still another object of this invention is to provide a scalding tank wherein the water contained thereby is locally subjected to mixing action at a plurality of regions within the tank.

Still a further object of this invention is to provide a section for a scalding tank which section is provided with means for recirculating water in said scalding tank.

And still a further object of this invention is to provide a scalding tank having means therein for directing the recirculated water more directly onto the fowl within the tank.

And still another object of this invention is to provide a scalding tank having a reduced amount of water therein, whereby the volume of fresh water being continually added is a greater proportion of the total volume of water in the tank.

With these and other objects in view, my invention consists in the construction, arrangement, and combination of the various parts of my device whereby the objects contemplated are attained, as hereinafter more fully set forth, pointed out in my claims, and illustrated in the accompanying drawings, wherein:

Figure 1 is a side elevational view, with parts broken away, of a sectional scalding tank made up of three sections, showing the scalder in use with a fowl conveyor, and also showing inlet and outlet chutes for the fowl.

Figure 2 is a top plan view, with parts broken away, of a sectional scalding tank similar to that shown in Figure 1, and with the fowl conveyor removed, but being made up of only two sections.

Figure 3 is a cross-sectional view of the scalding tank, with the fowl conveyor removed, and is taken on the line 3—3 of Figure 1, with the supporting legs shown in elevation.

Figure 4 is an enlarged cross-sectional view, with parts broken away, of the sectional scalding tank, showing particularly the flow conveyor and details of the pumping means for each section, and is taken on the line 4—4 of Figure 1.

Figure 5 is a side view partially in cross-section of a single section of the sectional scalding tank and is taken substantially on line 5—5 of Figure 4.

Figure 6 is a cross-sectional view of the connection between successive sections of the sectional scalding tank and is taken on line 6—6 of Figure 4.

Referring now to Figure 1, there is shown a sectional scalding tank generally indicated by numeral 10. The scalding tank 10 shown in Figure 1 is made up of three sections as indicated at 12, 14 and 16. Associated with the scalding tank 10 is a conveyor 18 which carries the fowl 20 through the scalding tank 10. The fowls 20 are suspended from conveyor 18 by means of chains 22 and shackles 24. An inlet chute, generally indicated at 26, is provided at one end of scalding tank 10 and an outlet chute, generally indicated at 28, is provided at the opposite end of scalding tank 10.

Also shown in Figure 1 is a makeup water line 30 through which additional water is brought into the scalding tank at a constant rate. It is necessary to bring additional water into the scalding tank because the scalded birds, after they have been removed from the tank, carry water with them. It is necessary to add aproximately a third to a half gallon of water to the scalding tank 10 for each fowl, such as a chicken, that is processed. Also shown in Figure 1 are means for introducing steam into the water within the scalding tank 10. The steam mixes with the water and serves to heat the water. It is necessary that steam be continually brought in, because otherwise the temperature of the water would fluctuate as additional water is brought in.

The steam piping means for introducing steam into the water within the scalding tank 10 includes a pipe 32 from the steam source (not shown), a thermostatically controlled valve 34, a trap 36, a by-pass line 38 with a manually operable valve 40 therein, a distribution pipe 42 and connections 46, 48 and 50 between steam distribution pipe 42 and the scalding tank 10. A thermostat 33 is immersed in the water in the scalding tank 10. A conduit 35 connects the thermostat 33 to the thermostatically controlled valve 34.

Each section of the scalding tank 10 is provided with a fitting 49 in one side of said section for receiving a header from the steam distribution pipe 42. However, it is not necessary to have a steam header to each side fitting 49 in each section. Thus, in Figure 1, only section 14 has a header to the fitting 49 in its side. Sections 12 and 16 have steam headers communicating with the sections at conections 46 and 50 located at the ends of the sections.

Referring now in particular to one of the sections of sectional scalding tank 10, reference is had to Figures 3, 4 and 5. As shown therein, the section 14 of sectional scalding tank 10 comprises a pair of longitudinal sides 52 and 54 disposed opposite each other and including a bottom wall 56 joining the walls 52 and 54. The pair of side walls 52 and 54 and the bottom wall 56 bound a water channel 58 which extends the entire length of section 14 of scalding tank 10. The fowl 20, suspended from the shackle 24, is carried through the water channel 58 along the length of the scalding tank 10.

Mounted on each of the walls 52 and 54 of section 14, adjacent the upper ends of walls 52 and 54, are means, such as the box-like structure illustrated, defining a water chamber 60. Each water chamber is totally enclosed, including the top thereof, except for an elongated orifice 62 formed in one side of water chamber 60. This elongated orifice runs substantially the entire length of the water chamber 60, as best shown in Figure 5. The orifice 62 of water chamber 60 opens onto the water channel 58 and at a point above the level of the water that is contained within the water channel 58. A pair of sheet metal members 64 and 66, which run the entire length of the orifice 62, are positioned adjacent the orifice 62 and serve to direct the water passing through orifice 62 in a desired direction, preferably downwardly directly onto the bird passing through the water channel 58, in the manner as shown in Figure 4.

The outlet of the water chamber 60 is the orifice 62 described above. Each water chamber 60 is provided with inlet means which includes a water pipe 68. The water pipe 68 is connected to the under side of water chamber 60 at a point about midway between the ends of said water chamber 60. The inlet 70 of water pipe 68 is in communication with the water channel 58, in a region adjacent the bottom of water channel 58. The inlet 70 of water pipe 68 is located adjacent one end of section 14 at a point below one end of the water chamber 60.

The inlets 70 of a pair of water pipes 68 associated with a pair of water chambers 60 for the same section 14 are located at opposite ends of the section 14, so that the inlets 70 do not face each other. Thus, the inlets 70 for the pair of water chambers 60 are located at opposite ends of the section 14 and also on opposite sides 52 and 54 of the section 14. This is a great advantage in that a greater amount of water within or adjacent to the section 14 is subject to being drawn into inlet 70 and then subjected to mixing action.

The spacing of the water chamber inlets is important in obtaining desirable mixing of the water. It will be noted that the water is drawn into the water pipes substantially at opposite ends of the section 14 and is then carried to the water chamber 60, where it is mixed and then distributed, along the entire length of the section 14, back into the water channel 58.

A filter or grating 67 is provided over the inlet 70 of each water pipe 68 to prevent entrance into the water pipes 68 of any loose objects such as a shackle, shackle chain, or unshackled bird from entering the water pipe and either clogging the pipe or causing damage to the pumping mechanism therein. The filter or grate 67 is made up of semi-circular rods 69 and cross rods 71 welded together. The ends of semi-circular rods 69 extend outwardly to form ears 73. A pair of pockets 75 are mounted on walls 52 and 54 adjacent each inlet 70 for receiving ears 73 so as to position the grating 67 over the inlet 70.

Associated with each water chamber 60 and each water pipe 68 is a pumping means for drawing water from water channel 58 through water pipe 68 into water chamber 60, where it is discharged through orifice 62 back into water channel 58. This pumping means includes a propeller 72 which is positioned in the water pipe 68 adjacent the junction of the water pipe 68 with the water chamber 60, as best shown in Figure 4.

The propeller 72 is driven by propeller shaft 74, which is journalled in the bearings 76 in a region above the water chamber 60. The propeller shaft 74 extends vertically downward into the water chamber 60, whereby the propeller 72 is positioned for pumping. The upper end of the propeller shaft 74 is also provided with a pulley 78, which provides for a driving connection thereof by means of belt 80 and motor 82.

A separate motor 82 is provided for each propeller 72, there being two propellers for each section of the sectional scalder 10. This provides that in case one of the motors fails to work, there will be at least partial recirculation of water within that section, and also permits of servicing one of the motors while the other motor continues to operate and while the scalder tank 10 is still being used. The motor 82 and the bearings support 76 for the propeller shaft 74 are enclosed within a housing 84.

During the operation of the pumping means, the water fills water chamber 60 substantially to the enclosed top of the chamber, the orifice 62 being the only outlet from chamber 60. The top of the water in water channel 58 is located a few inches, preferably about six inches, below the orifice 62. The water being discharged from the orifices 62 is directed down onto the birds passing through the water channel 58 and acts to submerge the birds in the water in channel 58. The water being discharged onto the birds from orifice 62 also acts as a pressurized stream in penetrating between the feathers of the bird in a more effective manner.

The section 14, as well as the other sections, are further equipped with end plates 86 and 88 for the purpose of connecting adjacent sections together. These end plates 86 and 88 extend transversely outward from the walls 52, 54 and 56. These plates 86 and 88 are provided with bolt holes for cooperation with an adjacent end plate. Each section is also provided with supporting legs 90 which are adjustable in height and which are detachably connected to end plates 86 and 88.

A typical connection between adjacent sections is shown in Figure 6 wherein an end plate 88, of one section, an end plate 86, of an adjacent section, and a rubber gasket 92 therebetween, are bolted together by means of bolts 94 and nuts 96. The gasket 92 serves to seal the joint between adjacent sections and prevent leakage of fluid. It will be noted that it is necessary to provide only a single pair of supporting legs 90 for each joint between adjacent sections, and accordingly supporting legs 90 are made detachable from end plates 86 and 88 of the sections.

Referring back to the inlet chute 26, said inlet chute 26 is provided with an end plate 98 for extension across the water channel 58 so as to bound that end of the water channel. The end plate 98 is adapted to be bolted onto the end plate 86 of section 12 shown in Figure 1. The inlet chute 26 is provided with a sheet metal section 100 which slopes upward and serves to align and guide the birds 20 which are carried along by the conveyor.

As the birds 20 are dragged up the incline of sheet metal section 100, they are picked up by a conveyor belt 102 which moves at a greater speed than the advancing speed of the conveyor. This conveyor 102 brings the birds 20 into the water within the water channel 58 at a time earlier than that at which they would have entered the water channel 58 by reason of their being conveyed by the conveyor 18. This earlier introduction of the bird 20 into the water in scalding tank 10 permits the use of a shorter scalding tank 10, as the birds are then within the water a longer time than ordinarily would have been provided.

The conveyor belt 102 is driven by a motor (not shown) and passes over rotary members or drums 103. A structural support 104 is provided for the inlet chute 26 and extends between end plate 98 and the junction between the sheet metal portion 100 and the movable conveyor portion 102 of inlet chute 26.

The outlet chute 28 includes a sheet metal portion 106 which slopes upwardly and which provides for ease in removing the fowl 20 from the water channel 58. The outlet chute 28 also includes an end mounting plate 108 which is secured to sloping sheet metal portion 106 and provides means for securing chute 28 to end plate 88 of section 16 of scalding tank 10.

Each section of the sectional scalding tank 10 is provided with a dump outlet 110 communicating with the bottom of water channel 58. The plurality of dump outlets 110 provides for rapid draining of the scalding tank 10 which is desirable when the water in the tank is being changed.

It is desirable that the amount of water in the scalding tank 10 be as little as possible. Therefore the width and depth of the water channel 58 are designed so as to be no larger than necessary to accommodate the largest size bird passing therethrough.

It can be seen that I have provided a variable length sectional scalding tank provided with an independent operable plurality of propellers for recirculating and mixing the water therein. It has also been provided that a minimum amount of water be used in the scalding tank and that the recirculating water be directed onto the birds passing through the tank whereby more efficient scalding of the birds is obtained.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a scalding tank for fowl, a pair of spaced longitudinal side walls and a bottom wall defining a longitudinal water channel having water therein up to a normal level and through which water the fowl is conveyed, at least one of said side walls having means thereon defining a substantially closed water chamber extending substantially the entire length of said wall, said means having a horizontal orifice in one side extending substantially the entire length thereof, said orifice being disposed above said normal water level in said water channel, a water pipe having an inlet and an outlet, said inlet being connected to said water channel adjacent the bottom thereof, said outlet being connected to said means defining the water chamber, and pumping means associated with said scalding tank for circulating water from said water channel to said means defining the water chamber through said water pipe and for causing said water to be discharged through said orifice downwardly over the fowl in said water channel.

2. A scalding tank as set forth in claim 1 including at least one member extending along the length of the orifice for controlling the direction of the water passing through said orifice.

3. A scalding tank as set forth in claim 1 including members extending along the upper and lower edges of the orifice for controlling the direction of the water passing through said orifice.

4. A scalding tank as set forth in claim 1 including members extending along the upper and lower edges of the orifice for controlling the direction of the water passing through said orifice, and said members being located within said water chamber.

5. In a scalding tank for fowl, a pair of spaced longitudinal side walls and a bottom wall defining a longitudinal water channel having water therein up to a normal level and through which water the fowl is conveyed, at least one of said side walls having means thereon defining a substantially closed water chamber extending substantially the entire length of said wall, said means having a horizontal orifice in one side extending substantially the entire length thereof, said orifice being disposed above said normal water level in said water channel, a water pipe having an inlet and an outlet, said inlet being connected to said water channel adjacent the bottom thereof, said outlet being connected to said means defining the water chamber, and pumping means associated with said scalding tank for circulating water from said water channel to said means defining the water chamber through said water pipe and for causing said water to be discharged through said orifice downwardly over the fowl in said water channel, said pumping means adapted to maintain said water chamber filled with water, and said orifice being spaced below the uppermost extent of the water chamber.

6. In a scalding tank for fowl, a pair of spaced longitudinal side walls and a bottom wall defining a longitudinal water channel having water therein up to a normal level and through which water the fowl is conveyed, at least one of said side walls having means thereon defining a substantially closed water chamber extending substantially the entire length of said wall, said means having a horizontal orifice in one side extending substantially the entire length thereof, said orifice being disposed above said normal water level in said water channel, a water pipe having an inlet and an outlet, said inlet being connected to said water channel adjacent the bottom thereof, said outlet being connected to said means defining the water chamber, pumping means associated with said scalding tank for circulating water from said water channel to said means defining the water chamber through said water pipe and for causing said water to be discharged through said orifice downwardly over the fowl in said water channel, and means on said tank aligned with the ends of the water channel in said tank providing for the entrance and exit of fowl to and from said water channel in said tank.

7. In a scalding tank for fowl, a pair of spaced longitudinal side walls and a bottom wall defining a longitudinal water channel having water therein up to a normal level and through which water the fowl is conveyed, at least one of said side walls having means thereon defining a substantially closed water chamber extending substantially the entire length of said wall, said means having a horizontal orifice in one side extending substantially the entire length thereof, said orifice being disposed above said normal water level in the water channel, a water pipe connected at one end to said water channel adjacent the bottom thereof and at the other end to the underside of said means defining the water chamber, and pumping means associated with said scalding tank for circulating water from said water channel to said means defining the water chamber through said water pipe and for causing said water to be discharged through said orifice downwardly over the fowl in said water channel, said pumping means including a propeller positioned in said water pipe adjacent the junction of the water pipe with said means defining the water chamber.

8. A device as set forth in claim 7 wherein said pumping means includes a shaft for said propeller extending upwardly through said water chamber and through the upper portion of said means defining said water chamber, and drive means positioned above said means defining the water chamber for driving said shaft and propeller.

9. In a scalding tank for fowl, a pair of spaced longitudinal side walls and a bottom wall defining a longitudinal water channel having water therein up to a normal level and through which water the fowl is conveyed, each of said side walls having means thereon defining a substantially closed water chamber extending substantially the entire length of the wall, each of said means having a horizontal orifice in one side extending substantially the entire length thereof, said orifice being disposed above the normal water level in said water channel, a water pipe associated with each water chamber, each water pipe being connected at one end to said water channel adjacent the bottom thereof and at the other end to said means defining the water chamber, and a pump associated with each water chamber for circulating water from said water channel to said means through said water pipe and for causing said water to be discharged through said orifice downwardly over the fowl in said water channel.

10. A scalding tank as set forth in claim 9 wherein the pair of water pipes are connected to said water channel at opposite ends thereof, each water pipe being connected to the underside of the means defining the water chamber at a point substantially midway between the ends of said means.

ALLEN W. SHARP.

References Cited in the file of this patent

UNITED STATES PATENTS

| Number | Name | Date |
|---|---|---|
| 1,346,595 | Dilg | July 13, 1920 |
| 1,672,555 | Barker et al. | June 5, 1928 |
| 1,757,103 | Voigt | May 6, 1930 |
| 1,934,916 | Dies | Nov. 14, 1933 |
| 2,399,267 | Szatyn | Apr. 30, 1946 |